BEST AVAILABLE COPY

T857,043

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 24, 1968

857 O.G. 1039

651,659

BLENDS OF ETHYLENE PROPYLENE TERPOLYMERS WITH POLYURETHANE

Joseph Edward Merkel, Wilmington, Del., assignor to E. I. du Pont de Nemours and Company, Wilmington, Del., a corporation of Delaware

Filed July 7, 1967. Published Dec. 24, 1968

Class 260—859

No Drawing. 8 Pages Specification

Elastomer compositions suitable for use as component parts, e.g., seals, cups, etc., in hydraulic brake systems, are made by curing an EPDM elastomer compound that includes a minor proportion, such as 3 to 6 phr. (parts per hundred parts of the EPDM polymer) of a curable polymeric polyurethane. The EPDM elastomer may be an ethylene/propylene/1,4-hexadiene terpolymer. The polyurethane may be an isocyanato-terminated aromatic diisocyanate/polytetramethyleneether glycol polyurethane. The curing agent is preferably an organic peroxide such as dicumyl peroxide. The polyurethane component causes the vulcanized composition to have a slight swelling action in the presence of conventional ester-type brake fluids, thus giving a desirable sealing action. The composition can include up to 20 phr. of ester-type brake fluid as plasticizer.